Jan. 27, 1970 H. F. THOMSON 3,492,668
COMPUTER REEL
Filed Dec. 20, 1966

INVENTOR.
HOWARD F. THOMSON
BY
Pennie, Edmonds, Morton, Taylor and Adams
ATTORNEYS United States Patent Office 3,492,668
Patented Jan. 27, 1970

3,492,668

COMPUTER REEL

Howard F. Thomson, Bedford Village, N.Y., assignor to Audio Devices, Inc., Glenbrook, Conn., a corporation of New York Filed Dec. 20, 1966, Ser. No. 603,205
Int. Cl. G11b *5/00*
U.S. Cl. 340—174.1 6 Claims

ABSTRACT OF THE DISCLOSURE

A tape reel cartridge for use in two differently operated computer machines, the cartridge having a file protect ring removably positioned in each of its flanges and a supply of recording tape wound between the flanges with reflective and transparent sensing spots located adjacent the ends of the tape for selective cooperation with the different computer machines.

This invention relates to computer tape reels and more particularly to tape reel cartridges constructed for use in two differently operated computer machines.

In present day computers, the recording tape is fed across the face of the machine from a supply reel onto a take-up reel. During the feeding of the tape in this manner, different operations may be performed. The tape may, for example, be fed through a reading mechanism which will read data already on the tape and, in turn, feed it to a memory device or to another tape in a companion machine; or the computer may read existing data on the tape and transcribe it directly onto record paper or punch it into cards. In either case, the computer operates only in a reading fashion.

If, on the other hand, it is desired to record new data or information on the tape, an erase and recording mechanism is brought into operative position with respect to the tape. If there is no information already on the tape, as is the case where a new supply reel is used, the erase function of the erase and recording mechanism will, of course, have no effect, and the new data will merely be recorded on the clean tape. If, however, the tape in the supply reel already has data recorded on it, which for one reason or another has become obsolete or no longer desired, the erase and recording mechanism of the computer will first erase this old data and then operate to record the desired new data in its place.

In order to set the computer for either a read or record operation, it is necessary to move the operating mechanism that is not to be used to an inoperative position and to move the other mechanism into operative position with respect thereto. For this purpose, presently constructed computers are provided with a sensing mechanism, in the form of a sensing finger, adapted to engage and ride along the flange of the tape supply reel that faces the computer; and this flange is constructed with an annular recess, opposing the sensing mechanism, that may either be left open or be covered with a separate removable file protect ring. Depending on whether or not the file protect ring is in place, the sensing finger will be made to stay in a retracted position and ride along the exposed surface of the file protect ring or be permitted to move outwardly of the computer and into the recess as the reel rotates.

When it is desired to read data from the tape as it is being fed across the computer, the supply reel is positioned on the front wall of the computer with the flange containing the annular recess facing the machine and with the file protect ring in place within the recess. With the file protect ring in place and the sensing finger of the machine prevented from entering the recess as the reel rotates to feed out the tape, the computer will only be operative to read existing data on the tape.

When it is desired to record data on the tape or to erase existing data and record new data, the supply reel is manually removed from the computer and the file protect ring removed from the recess. The supply reel is then repositioned on the machine and the sensing finger of the machine is thereby permitted to move into this recess. Movement of the sensing finger outwardly from the front wall of the machine, in turn, disconnects the reading mechanism and connects the erase and recording mechanism enabling the computer to erase and/or record new data on the tape.

In addition to setting the machine so that it will read existing data or alternatively erase and/or record new data, additional sensing means are provided in the computer to control the feeding of the tape and at the same time initiate and stop the reading and recording operations at points spaced from the ends of the tape. The purpose of this control is twofold. First, it prevents recordings from being made on the end of the tape which is to be handled by the operator in initially feeding it through the various feed mechanisms and secondly, it prevents the trailing end of the tape from being pulled off the supply reel as the supply becomes exhausted. This sensing means is, in turn, controlled by the tape being fed through the computer and for this purpose, two different approaches have been developed.

In one, the tape adjacent each end thereof is provided with a reflective sensing spot and the tape sensing means of the machine is comprised of a photoelectric device controlled by light reflected off the tape. As the tape is fed past this photoelectric device and the reflective spot encountered by the beam of light from the light source, it will be reflected off the spot and back to the photoelectric cell of the device. The machine is constructed so that when the reflective spot adjacent the leading end of the tape is sensed, the machine will be actuated to begin the desired operation of either reading existing data or recording new data; and when the reflective spot adjacent the traling end of the tape, which is attached to the hub of the supply reel, is encountered, the machine will be actuated to stop the reading or recording and to also stop the feeding of the tape and thereby prevent it from being pulled off the supply reel.

In a machine having this type of sensing mechanism, the reel of tape is conventionally mounted on the face of the machine for rotation in a clockwise direction in unwinding the tape; and the tape on this reel, which is made of a suitable plastic material such as Mylar, is provided with an oxide coating on the surface facing toward the center of the reel, thus forming the operative side of the tape, and with reflective spots adjacent either end thereof on the uncoated or Mylar side.

In a second type of computer presently available for recording and storing data on tape, the tape supply reel is mounted on the face of the machine for unwinding the tape by rotation in a counterclockwise rather than clockwise direction, and a different type of sensing means is used to initiate and stop the various operations performed on the tape. In particular, the sensing mechanism is comprised of a photoelectric device having a light source positioned on one side of the tape and a photocell unit positioned on the other side; and the tape used in this type of machine is, in turn, provided with transparent spots adjacent either end thereof for permitting the beam of light from the light source to pass through the tape and to the cooperating light sensing unit as such spots pass through the light beam. As with the first described machine, the initiation of the machine functions will be controlled by the positioning of the spots adjacent the leading end of the tape while the stopping of the machine functions will be controlled by the spot adjacent the trailing end of the tape. Also, the reel used for containing the tape used in this second type of machine will, as with the reel used in the first described machine, have an annular recess and file protect ring on the flange portion that faces the machine. Relative to the direction of winding of the tape on the supply reel, however, this recess will be on the opposite flange from where it is found on the reel used in the first described machine.

It is evident from the above that because of the different characteristics of these two types of machines and of the tape cartridge reels which each requires, it is not possible to use these reels interchangeably in both machines. The machine in which the tape is unwound by rotating the reel in a clockwise direction requires the reflective type of sensing spots on the tape and also requires that the annular recess and file protect ring be disposed on one particular flange of the reel while the machine in which the tape is unwound by rotating the reel in a counterclockwise direction requires a tape having transparent sensing spots and a reel having a recess and file protect ring on the opposite flange.

In accordance with the teachings of the present invention, applicant has devised a single reel and tape package which is interchangeably useable in either of these two types of machines. Generally, this result is effected by providing an annular recess and file protect ring on each of the flanges of the reel so that one of them will face the front wall of the machine regardless of whether the tape is fed off the reel by its rotation in a clockwise or counterclockwise direction. By providing an annular recess and file protect ring on either side of the reel, the finger sensing mechanism of either of the two differently constructed computers will be operative to control either machine to read existing data or to erase and record new data by cooperating with the appropriate flange of the reel properly placed on the machine.

In addition to this, however, it is still necessary that the tape be provided with sensing means that are operable with the different photoelectric sensing mechanisms of the two computers; and such sensing means must be oriented so that they will not interfere with each other and so that only the appropriate ones will be operative in the particular machine being used. For this purpose, the reflective sensing spots are again provided adjacent each end of the tape on its uncoated side so that when fed through the computer which uses the reflective type of photoelectric sensor, they will be properly sensed by this sensing device. These reflective spots will not affect the operation of the other type of computer nor interfere with the operations to be performed on the tape in that machine since they are positioned on the non-operative side of the tape. In order, however, to permit this same tape to function properly in the computer where the parts of the photoelectric sensing device are positioned on opposite sides of the tape, the tape is also provided with the transparent sensing spots; and to keep the transparent spots from affecting the operation of the recording or reading in the computer having the reflective type of sensing device, these spots are positioned outwardly of the reflective ones, that is, nearer to the ends of the tape.

With the two types of sensing spots oriented in this manner, the tape when fed through the machine having the reflective sensing device, will be controlled solely by the reflective spots and the transparent spots being positioned outwardly of the reflective ones will not in any way interfere with the functioning of the machine. Alternatively, when this same tape is fed through the machine requiring transparent sensing spots on the tape, such spots will operate to control the tape and since the reflective spots are on the non-operative side of the tape, they will not interfere with the proper functioning of this machine.

A more complete understanding of the present invention will be obtained from a reading of the following detailed description with reference being made to the accompanying drawings of which:

Figures 1, 2, 3, 4, 5:
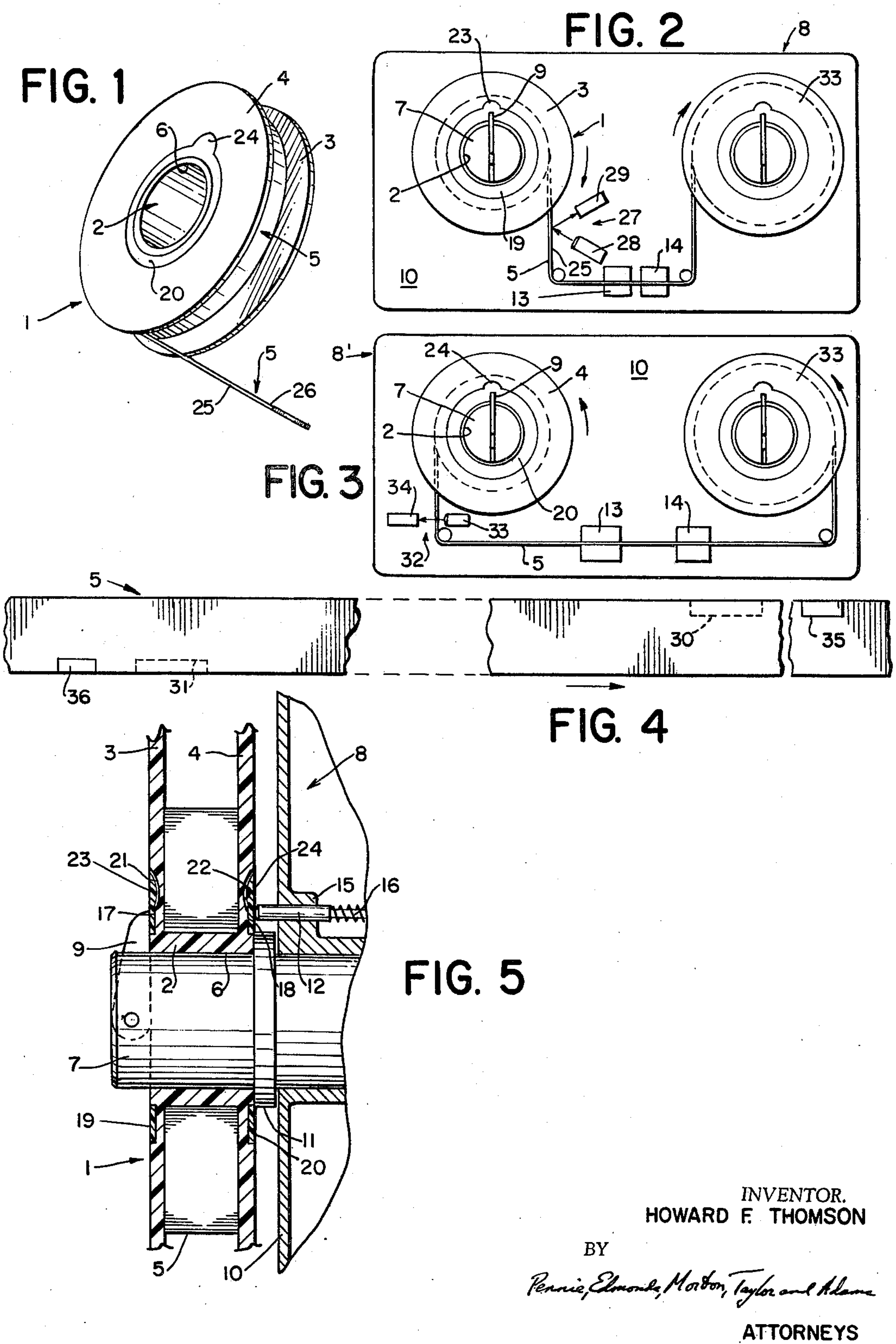
FIG. 1 is a perspective view of the tape reel cartridge of the present invention.
FIG. 2 is a schematic side elevation of one type of computer with the tape reel cartridge of FIG. 1 mounted thereon.
FIG. 3 is a schematic side elevation of another type of computer with the tape reel cartridge of FIG. 1 mounted thereon.
FIG. 4 is a plan view of the tape showing the sensing spots adjacent either end thereof.
FIG. 5 is a partial cross-sectional view of the tape reel cartridge of FIG. 1 and associated computer showing the reel mounted for a reading operation.

As shown in FIG. 1, the tape reel cartridge unit 1 of the present invention is generally comprised of a hub 2, spaced flanges 3 and 4, and a coil of recording tape 5 wound upon the hub. The hub portion of the reel is provided with a bore 6 extending centrally therethrough for mounting the reel on a supply reel drive shaft 7 of the computer 8 as shown in FIG. 5. The reel is locked onto the drive shaft of the computer by means of the locking handle 9 attached to the free end of the drive shaft and is spaced from the front face 10 of the computer by engagement with the collar 11 of the drive shaft.

In accordance with the teachings of the present invention, the reel tape cartridge is constructed for use in either of two differently operated computers. One of these computers 8, shown in FIGS. 2 and 5, requires that the coil of tape be unwound from the supply reel by rotation of the reel in a clockwise direction and includes a reflective type of tape feed control sensing mechanism for cooperating with reflective sensing spots on the tape to control the feeding of the tape through the computer as well as the initiation and stopping of the operations to be performed on the tape. In the other computer 8', shown in FIG. 3, the tape is, on the other hand, unwound from the supply reel by driving the reel in a counterclockwise direction and its feeding through the machine controlled by means of a sensing mechanism requiring transparent sensing spots on the tape.

The tape as it is fed through either of these computers is operated upon to either read existing data on the tape or to erase existing data and/or record new information thereon, these alternative operations being controlled by means of a finger sensing mechanism mounted in each of the computers and adapted to cooperate with a control area on one of the flanges of the tape supply reel. This sensing mechanism as shown in FIG. 5 is comprised of a sensing finger 12 mounted adjacent the front face 10 of the computer. It is operatively connected to both the computer reading mechanism 13 and the computer erase and recording mechanism 14 shown schematically in FIGS. 2 and 3 by conventional means, not shown. The sensing finger is slidably received in a bearing member 15 on the computer front wall with the free end thereof extending outwardly of the front face of the computer. A spring 16 urges the sensing finger in an outward direction with respect to the computer face; and depending on the axial position of the sensing finger, one of the operating mechanisms 13, 14 of the computer will be moved to an operative position with respect to the tape being fed across the front of the computer while the other mechanism will be moved to an inoperative position. Conventional means, not shown, are employed for effecting this result and are constructed so that when the sensing finger 12 is in a retracted position, as shown in FIG. 5, the computer will be operative to perform only a reading operation; and when the sensing finger is permitted to move outwardly of the computer face, the computer will be operative to effect only an erase and/or recording operation. For controlling the axial position of the sensing finger, the outer surface of the flanges 3, 4 of the supply reel are provided with annular recesses 17, 18 and file protect rings 19, 20 removably positioned within each of such recesses.

As shown in FIG. 5, the annular recesses are disposed adjacent to but spaced from the hub 2 of the reel and are provided with finger recesses 21, 22 adapted to receive a complementary shaped tab portion 23, 24 formed on each of the file protect rings. The file protect ring itself is held within its annular recess by frictional engagement with the walls of the recess and may be readily removed therefrom by pulling on the tabs.

The tape 5 which is formed with a backing 25 of transparent plastic material such as Mylar is wound on the supply reel with the operative side of the tape facing toward the center of the coil. This side of the tape includes a suitable oxide surface 26 upon which the reading and recording mechanisms of the computer operate.

As described above, each of the flanges of the reel constructed in accordance with the teachings of the present invention are provided with their own annular recesses and file protect rings. Accordingly, the reel may be mounted on the drive shaft of either computer with one of the annular recesses facing and positioned in alignment with the sensing finger of the computer. In the computer shown in FIGS. 2 and 5, the tape reel cartridge will be mounted on the drive shaft with the flange 4 facing the front wall of the computer and the tape will be unwound from the reel by rotation of the reel in a clockwise direction.

For controlling both the feeding of the tape and the initiation and stopping of the operating mechanisms 13, 14 of the computer, a reflective type of sensing device 27 is employed. This sensing device comprises a light source 28 and a photocell unit 29 positioned in the computer for reflecting a beam of light off the uncoated side of the tape; and for cooperating with this sensing mechanism, the tape 5, on its uncoated or non-operative side, is provided with reflective spots 30, 31 adjacent the leading and trailing ends thereof as shown in FIG. 4. The leading end of the tape 5 is toward the right in FIG. 4 and the reflective spot 30 is positioned a sufficient distance from this leading end so that the tape may be initially fed through the operating mechanisms of the computer and connected to the take up reel 33 without pulling the spot past the sensing mechanism 27. Then, when the computer is turned on, the feeding of the tape will commence and as soon as the reflective spot 30 comes into the beam of light emanating from the light source 28, it will be reflected into the photocell unit 29. The photocell unit is, in turn, connected by conventional means, not shown, to both the reading and recording mechanisms 13, 14 of the computer so as to actuate either one of these mechanisms when light is sensed by the photocell. As described above, the particular mechanism which will be actuated will depend on the presence or absence of the file protect ring 20 within the annular recesses 18.

The trailing end of the tape which is to the left as the tape is view in FIG. 4 is attached to the hub of the supply reel in any conventional manner and in order to prevent the tape from being pulled off the supply reel as the supply is depleted, the reflective spot 31 is spaced from the trailing end by a sufficient distance so that upon being sensed by the sensing mechanism 27, the feeding of the tape across the computer will be stopped while there is still some supply of tape on the reel hub. The sensing of the spot 31 will also stop the reading or recording operation being performed on the tape.

In accordance with the teachings of the present invention, this same supply reel may be operated in the computer 8′ shown in FIG. 3 where the tape is unwound from the reel by rotation of the reel in a counterclockwise direction and where the sensing mechanism 32 is of the type having a light source 33 and a photocell unit 34 positioned on opposite sides of the tape. For this purpose, the reel is provided with the second annular groove 17 and file protect ring 19 as described above so that the reel may be operatively mounted on the drive shaft of this computer in the reverse manner from its mounting in the computer 8 of FIG. 2. In addition, the tape is provided with transparent sensing spots 35, 36 adjacent the leading and trailing ends of the tape. These transparent spots, when fed through the beam of light emanating from the light source 33 will function in a manner similar to that described above with regard to the reflective spots to control both the feeding of the tape and the operation of the reading and recording mechanisms of the computer. That is, when the transparent spot 35 adjacent the leading end of the tape is sensed, the reading or recording operation will be initiated and will not be stopped until the transparent spot 36 adjacent the trailing end of the tape is sensed.

In order that this entire area of the tape may receive data from the computer 8′, the oxide coating 26 on its operative side must be continuous. Any blemish or interruption in this area would represent a bad area in the tape preventing such recording and it is apparent that this would be undesirable. It will be seen for FIG. 4 that the reflective sensing spots 30, 31 which are provided on the tape for cooperating with the sensing mechanism 27 of the computer 8 are positioned inwardly of the transparent spots within the operative area of the tape. Since, however, these reflective spots are positioned on the non-operative side of the tape, they effect no interruption in the coating 26 between the transparent spots and thus will not interfere with the operation of the computer 8′.

In a like manner, the transparent spots 35, 36 which may be provided by scraping away a portion of the oxide coating must be positioned on the tape in such a way that they will not interfere with the operation of the computer 8 shown in FIG. 2. In accordance with the present invention, they are positioned outwardly of the reflective spots 30, 31. The leading transparent spot will be spaced from the reflective spot 30 by a sufficient distance so that it will be fed past the mechanisms 13 and 14 before the reflective spot is encountered by the sensing mechanism 27; and accordingly, no reading or recording operation will be performed on the tape in the area of the transparent spot when the supply reel is mounted in the computer shown in FIG. 1. Likewise, the reflective spot 31 adjacent the trailing end of the tape will be sensed before the transparent spot to stop feeding of the tape and thus will not pass through the reading and recording mechanisms of the computer.

With the construction of the tape reel cartridge as described above including the annular grooves and file protect rings on both flanges and the orientation of the different sensing spots on the tape, it will be seen that such cartridge may be used in either type of computer machine shown in FIGS. 2 and 3 even though these machines require different tape unwinding directions and different sensing mechanisms for controlling the movement of the tape and the reading and recording thereon.

The above description is given of the preferred embodiment of the tape reel cartridge of the present invention; however, it is to be understood that various modifications may be made without departing from the scope of the invention as set forth in the following claims.

I claim:

1. A tape reel cartridge comprising:

(a) a reel having a hub and side flanges;

(b) a bore extending centrally through said hub and side flanges;

(c) an annular recess in the outer surface of each of said side flanges disposed concentrically with respect to said bore;

(d) a file protect ring removable disposed within each of said recesses and having an outer exposed surface substantially flush with the outer surface of the respective flange; and (e) a supply of recording tape wound on said hub between said flanges, said tape having:

(1) a coating defining a recording surface on the side thereof facing toward the center of said reel, (2) a reflective sensing spot disposed adjacent to but spaced from the ends of said tape on the non-recording side; and (3) a transparent sensing spot disposed between each end of said tape and the adjacent reflective spot.

2. A tape reel cartridge according to claim 1 wherein:

(a) said reflective and transparent sensing spots adjacent one end are disposed along one edge of said tape and those adjacent the other end along the opposite edge thereof.

3. A tape reel cartridge according to claim 1 wherein:

(a) said annular recesses are positioned adjacent to but spaced from said bore.

4. A tape reel cartridge according to claim 1 wherein:

(a) said recording tape is transparent and the coating thereon is non-transparent.

5. A tape reel cartridge according to claim 4 wherein:

(a) said transparent sensing spots are defined by areas on the tape from which said coating has been removed.

6. A tape reel cartridge for use in computer machines having a supply reel shaft for supporting said tape reel cartridge, a take-up reel shaft spaced from said supply reel shaft for supporting a take-up reel, reading and recording mechanisms operatively positioned between said shafts and through which the tape of the supply reel is adapted to pass on being fed to the take-up reel, first sensing means disposed adjacent said supply reel shaft for setting said mechanism for either a reading or recording operation, and a second sensing means disposed between said supply reel shaft and said reading and recording mechanisms for controlling both the stopping of the tape feed and the operation of the reading and recording mechanism, said cartridge comprising:

(a) a reel having a hub and side flanges;

(b) a bore extending centrally through said hub and side flanges for receiving said supply reel shaft;

(c) an annular recess in the outer surface of each of said side flanges disposed concentrically with respect to said bore and adapted to be in alignment with said first sensing means when said cartridge is mounted on said supply reel shaft;

(d) a file protect ring removably disposed within each of said recesses and having an outer exposed surface substantially flush with the outer surface of the respective flange;

(e) a supply of recording tape wound on said hub between said flanges, said tape having:

(1) a coating defining a recording surface on the side thereof facing toward the center of said reel, (2) a first reflective sensing spot disposed adjacent to but spaced from the leading end of said wound tape on the non-recording side thereof, (3) a second reflective sensing spot disposed adjacent to but spaced from the trailing end of said wound tape on the non-recording side thereof, (4) a first transparent sensing spot disposed between said first reflective spot and the leading end of said wound tape with the spacing between said first spots being greater than the spacing between said first reflective spot and the reading and recording mechanism of said computer, and (5) a second transparent sensing spot positioned adjacent the trailing end of said wound tape and oriented with respect to said second reflective spot whereby said second reflective spot is fed through said second sensing means upon feeding of the the tape from the supply reel to the take-up reel while said second transparent spot is disposed between the supply reel and the reading and recording mechanism.

References Cited

UNITED STATES PATENTS

| | | | |
|---|---|---|---|
| 3,037,093 | 5/1962 | Nowlan | 179—100.2 |
| 3,328,907 | 7/1967 | Burgess | 242—71.8 |
| 3,335,410 | 8/1967 | Baskin | 340—174.1 |

STANLEY M. URYNOWICZ, JR., Primary Examiner

J. ROSENBLATT, Assistant Examiner

U.S. Cl. X.R.

179—100.2